US011395356B1

(12) United States Patent
Savage et al.

(10) Patent No.: US 11,395,356 B1
(45) Date of Patent: Jul. 19, 2022

(54) USER ACCOUNT AWARE PERSONAL AREA NETWORK BONDING

(71) Applicant: Google LLC, Mountain View, CA (US)

(72) Inventors: Henry Salvatore Savage, Mountain View, CA (US); Andrew Cheng, Mountain View, CA (US); Joseph Pirozzo, Rochester Hills, MI (US); Ryan Weekes, Los Altos, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/305,266

(22) Filed: Jul. 2, 2021

(51) Int. Cl.
G06F 15/177 (2006.01)
H04W 76/11 (2018.01)
H04L 41/0813 (2022.01)
H04W 84/10 (2009.01)

(52) U.S. Cl.
CPC ......... H04W 76/11 (2018.02); H04L 41/0813 (2013.01); H04W 84/10 (2013.01)

(58) Field of Classification Search
CPC .... H04W 76/11; H04W 84/10; H04L 41/0813
USPC ......................................................... 709/220
See application file for complete search history.

(56) References Cited

U.S. PATENT DOCUMENTS

2011/0300802 A1 12/2011 Proctor, Jr. et al.
2015/0105019 A1* 4/2015 Liu ....................... H04W 76/14
455/41.2
2015/0164326 A1* 6/2015 Baker .................. A61B 5/6824
340/870.07
2015/0351142 A1 12/2015 Seymour et al.
2015/0365817 A1* 12/2015 Chu ..................... H04L 67/1095
455/552.1
2016/0360341 A1 12/2016 Srivatsa et al.
2017/0005820 A1 1/2017 Zimmerman et al.
2018/0025295 A1 1/2018 Levin et al.
(Continued)

FOREIGN PATENT DOCUMENTS

WO 2018041795 A1 3/2018

OTHER PUBLICATIONS

Extended Search Report from counterpart European Application No. 21197488.6 dated Feb. 2, 2022, 8 pp.
(Continued)

Primary Examiner — Atta Khan
(74) Attorney, Agent, or Firm — Shumaker & Sieffert, P.A.

(57) ABSTRACT

A host computing device may perform various aspects of the techniques described in this disclosure, and comprises a memory, a processor, and a personal area network (PAN) interface. The memory may store PAN configuration data for each user account of different user accounts, where the PAN configuration data includes a separate layer two host address (L2HA) for use by the PAN interface when supporting a PAN link. The processor may execute an operating system that, responsive to a first user account logging into the operating system: obtain, from the memory, first PAN configuration data of the PAN configuration data specific to the first user account; and initiate programming of the PAN interface to use a first L2HA included in the first PAN configuration data. The PAN interface may establish, using the first L2HA, a first PAN link with a first client computing device associated with the first user account.

20 Claims, 4 Drawing Sheets

(56) References Cited

U.S. PATENT DOCUMENTS

2018/0131671 A1* 5/2018 Thaler ................ H04L 61/2092
2021/0136846 A1 5/2021 Ponnusamy et al.

OTHER PUBLICATIONS

Stockwell, "Sharing Bluetooth Pairing Between Multiple Host Devices", Technical Disclosure Commons, Jan. 27, 2021, Retrieved from https://www.tdcommons.org/dpubs_series/4020.

* cited by examiner

USER ACCOUNT AWARE PERSONAL AREA NETWORK BONDING

BACKGROUND

Personal area networks (PANs) enable local wireless connections (e.g., within 10 meters) between two or more devices, where such connections are commonly referred to as links or PAN links. The use of PANs has facilitated a wide number of use cases, allowing, for example, a wireless mouse and/or wireless keyboards to establish a wireless PAN link with a computing device to enable user input to the computing device. Given that such use cases often involve devices, such as the wireless mouse and/or wireless keyboards, that are used by multiple different users across varying user accounts, PAN protocols generally pair (or, in other words, bond) such devices to the computing devices itself and do not provide for pairing that is distinct for any given user account. As a result, the computing device may present devices paired via any user account present at the computing device to facilitate use of the devices across user accounts, which may at times result in user confusion when a different user has paired a device unknown to the user currently operating the computing device.

SUMMARY

In general, various aspects of the techniques set forth in this disclosure are directed to user account aware personal area network (PAN) bonding. Rather than bond a client computing device to a host computing device across user accounts, the techniques described in this disclosure may enable the host computing device to establish separate PAN bonds for each user account supported by the host computing device. To facilitate such user account aware PAN bonding, the host computing device may assign a separate layer two host address for each user account, which the host computing device may use to program a PAN interface. By programming the PAN interface to use this separate layer two host address for a particular user account, the client computing device receives a dedicated and separate PAN link that effectively "sandboxes" the user account in terms of which devices are displayed as being associated with the host computing device.

As such, various aspects of the techniques may enable host computing devices to operate more securely while also promoting more efficient operation. For example, by limiting PAN bonding to only those client computing devices that a user of the current client computing device knows to be associated with the host computing device, the user may experience less confusion that results in feelings of data insecurity. As such, the user may not attempt to unpair (or, in other words, de-bond) unfamiliar client computing devices, which may involve the host computing device performing unnecessary operations that consume computing resources (such as, processor cycles, memory, memory bus bandwidth, etc. and the accompanying power). In this respect, data security may be improved from the perspective of the user of the client computing device, while also improving operation of the host computing device.

In an example, aspects of the techniques are directed to a host computing device, comprising: a personal area network interface; a memory configured to store personal area network configuration data for each user account of a plurality of different user accounts, the personal area network configuration data including a separate layer two host address for use by the personal area network interface when supporting a personal area network link with a client computing device associated with a respective user account of the plurality of user accounts; and one or more processors configured to execute an operating system, the operating system configured to, responsive to a first user account of the plurality of user accounts logging into the operating system: obtain, from the memory, first personal area network configuration data of the personal area network configuration data specific to the first user account; and initiate programming of the personal area network interface to use a first layer two host address included in the first personal area network configuration data, wherein the personal area network interface is configured to establish, using the first layer two host address, a first personal area network link with a first client computing device associated with the first user account.

In another example, aspects of the techniques are directed to a method comprising: storing personal area network configuration data for each user account of a plurality of different user accounts, the personal area network configuration data including a separate layer two host address for use by a personal area network interface when supporting a personal area network link with a client computing device associated with a respective user account of the plurality of user accounts; executing an operating system that, responsive to a first user account of the plurality of user accounts logging into the operating system: obtains, from the memory, first personal area network configuration data of the personal area network configuration data specific to the first user account; and initiates programming of the personal area network interface to use a first layer two host address included in the first personal area network configuration data; and establishing, using the first layer two host address, a first personal area network link with a first client computing device associated with the first user account.

In another example, aspects of the techniques are directed to a non-transitory computer-readable storage medium having instructions stored thereon that, when executed, cause one or more processors of a host computing device to: store personal area network configuration data for each user account of a plurality of different user accounts, the personal area network configuration data including a separate layer two host address for use by a personal area network interface when supporting a personal area network link with a client computing device associated with a respective user account of the plurality of user accounts; execute an operating system that, responsive to a first user account of the plurality of user accounts logging into the operating system: obtains, from the memory, first personal area network configuration data of the personal area network configuration data specific to the first user account; and initiates programming of the personal area network interface to use a first layer two host address included in the first personal area network configuration data; and establish, using the first layer two host address, a first personal area network link with a first client computing device associated with the first user account.

In another example, aspects of the techniques are directed to a apparatus comprising: means for storing personal area network configuration data for each user account of a plurality of different user accounts, the personal area network configuration data including a separate layer two host address for use by a personal area network interface when supporting a personal area network link with a client computing device associated with a respective user account of the plurality of user accounts; means for executing an operating system that, responsive to a first user account of the plurality of user accounts logging into the operating system: obtains, from the memory, first personal area network configuration data of the personal area network configuration data specific to the first user account; and initiates programming of the personal area network interface to use a first layer two host address included in the first personal area network configuration data; and means for establishing, using the first layer two host address, a first personal area network link with a first client computing device associated with the first user account.

The details of one or more examples are set forth in the accompanying drawings and the description below. Other features, objects, and advantages of the disclosure will be apparent from the description and drawings, and from the claims.

DETAILED DESCRIPTION

Figure 1:
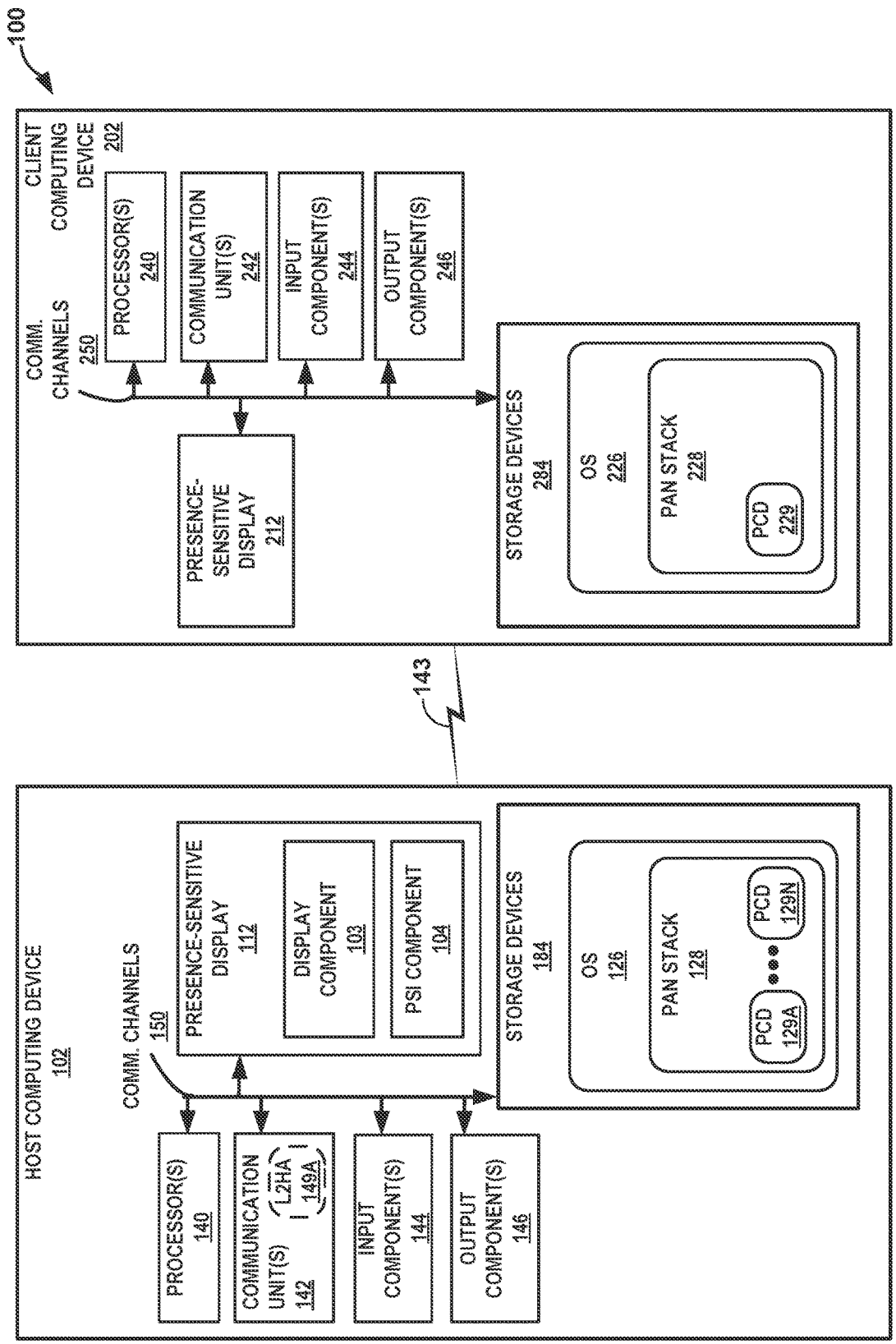
FIG. 1 is a block diagram illustrating an example computing system that is configured to provide user account aware personal area network bonding in accordance with various aspects of the techniques described in this disclosure.

FIG. 1 is a block diagram illustrating an example computing system that is configured to provide user account aware personal area network bonding in accordance with various aspects of the techniques described in this disclosure. As shown in the example of FIG. 1, a computing system 100 includes a host computing device 102 and a client computing device 202. Although described with respect to a vehicle, the computing system 100 may be utilized in different contexts, including standalone computing systems (including laptop computers, desktop computers, workstations and the like), gaming systems, cellular telephones (including so-called "smartphones"), media systems (including streaming media systems), audio/visual (A/V) receivers, televisions (including so-called "smart televisions"), smart speakers, smart watches, thermostats (including so-called "smart thermostats"), smart glasses, or any other computing system.

In any event, host computing device 102 is an example of vehicle computing device, such as head unit or other vehicular computing system (such as an electronic control unit—ECU). FIG. 1 illustrates only one particular example of host computing device 102, and many other examples of host computing device 102 may be used in other instances and may include a subset of the components included in example computing device 102 or may include additional components not shown in FIG. 1.

As shown in the example of FIG. 1, host computing device 102 includes presence-sensitive display 112, one or more processors 140, one or more communication units 142, one or more input components 144, one or more output components 146, and one or more storage devices 148. Storage devices 148 of host computing device 102 may store (or otherwise, include) software modules, such as an operating system (OS) 126 that supports a personal area network (PAN) stack 128 that operates according to a suite of PAN protocols, such as Bluetooth™ and various profiles thereof, e.g., Bluetooth™ low energy (BLE).

Communication channels 150 may interconnect each of the components 112, 140, 142, 146, and/or 148 for inter-component communications (physically, communicatively, and/or operatively) and thereby allow components 112, 140, 142, 146, and 148 to communicate with one another. In some examples, communication channels 150 may include a system bus, a network connection, one or more inter-process communication data structures, or any other components for communicating data (also referred to as information). Although shown as including components 112, 140, 142, 146, and 148, host computing device 102 may include other components or less components than those shown, where such components may be included in other control units such as a telematic control unit (TCU).

One or more communication units 142 of host computing device 102 may communicate with external devices by transmitting and/or receiving data. For example, host computing device 102 may use one or more of communication units 142 to transmit and/or receive radio signals on a radio network such as a cellular radio network. In some examples, communication units 142 may transmit and/or receive satellite signals on a satellite network such as a Global Positioning System (GPS) network. Examples of communication units 142 include a network interface card (e.g., an Ethernet card), an optical transceiver, a radio frequency transceiver, a GPS receiver, or any other type of device that can send and/or receive information. Other examples of communication units 142 may include short wave radios (e.g., near field communication (NFC), personal area networks—such as Bluetooth® and different profiles thereof, e.g., Bluetooth® low energy (BLE), etc.), GPS, 3G, 4G, 5G, and WiFi® radios found in mobile devices as well as Universal Serial Bus (USB) controllers and the like. In the example of FIG. 1, communication units 142 are assumed to implement a personal area network (PAN) interface by which wireless local area network connections may be established with another computing device (e.g., client computing device 202).

One or more input components 144 of host computing device 102 may receive input. Examples of input are tactile, audio, kinetic, and optical input, to name only a few examples. Input components 144 of host computing device 102 include, in one example, a mouse, keyboard, touchpad, voice responsive system, video camera, buttons, scroll wheel, dial, control pad, microphone or any other type of device for detecting input from a human or machine. Input components 144 may include cameras. In some examples, input component 144 may be a presence-sensitive input component, which may include a presence-sensitive screen, touch-sensitive screen, etc. separate from presence-sensitive display 112.

One or more output components 146 of host computing device 102 may generate output. Examples of output are tactile, audio, and video output. Output components 146 of host computing device 102, in some examples, include a presence-sensitive screen (possibly separate from presence-sensitive display 112), sound card, video graphics adapter card, speaker, cathode ray tube (CRT) monitor, liquid crystal display (LCD), organic light emitting diode (OLED), or any other type of device for generating tactile, audio and/or visual output to a human or machine.

In some examples, presence-sensitive display 112 of host computing device 102 may include functionality of input component 144 and/or output components 146. In the example of FIG. 1, presence-sensitive display 112 may include a presence-sensitive input (PSI) component 104 ("PSI component 104"), such as a presence-sensitive screen or touch-sensitive screen. In some examples, presence-sensitive input component 104 may detect an object at and/or near the presence-sensitive input component. As one example range, presence-sensitive input component 104 may detect an object, such as a finger or stylus that is within two inches or less of presence-sensitive input component 104. Presence-sensitive input component 104 may determine a location (e.g., an (x,y) coordinate) of the presence-sensitive input component at which the object was detected. In another example range, presence-sensitive input component 104 may detect an object two inches or less from presence-sensitive input component 104 and other ranges are also possible. Presence-sensitive input component 104 may determine the location of presence-sensitive input component 104 selected by a user's finger using capacitive, inductive, and/or optical recognition techniques.

In some examples, presence-sensitive display 112 may also provide output to a user using tactile, audio, or video stimuli as described with respect to output component 146. For instance, presence-sensitive display 112 may include display component 103 that displays a graphical user interface. Display component 103 may be any type of output component that provides visual output, such as described with respect to output components 146. While illustrated as an integrated component of host computing device 102, presence-sensitive display 112 may, in some examples, be an external component that shares a data or information path with other components of host computing device 102 for transmitting and/or receiving input and output.

For instance, presence-sensitive display 112 may be a built-in component of host computing device 102 located within and physically connected to the external packaging of host computing device 102 (e.g., an in-vehicle screen mounted in a dashboard of a vehicle). In another example, presence-sensitive display 112 may be an external component of host computing device 102 located outside and physically separated from the packaging of host computing device 102 (e.g., a monitor, a projector, etc. that shares a wired and/or wireless data path with an electronic control unit of the vehicle). In some examples, presence-sensitive display 112, when located outside of and physically separated from the packaging of host computing device 102, may be implemented by two separate components: a presence-sensitive input component 104 for receiving input and a display component 103 for providing output.

One or more storage components 148 within host computing device 102 may store information for processing during operation of host computing device 102 (e.g., computing device 102 may store data accessed by modules 126-136 during execution at host computing device 102). In some examples, storage component 148 is a temporary memory, meaning that a primary purpose of storage component 148 is not long-term storage. Storage components 148 on host computing device 102 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 148, in some examples, also include one or more computer-readable storage media. Storage components 148 in some examples include one or more non-transitory computer-readable storage mediums. Storage components 148 may be configured to store larger amounts of information than typically stored by volatile memory. Storage components 148 may further be configured for long-term storage of information as non-volatile memory space and retain information after power on/off cycles. Examples of non-volatile memories include magnetic hard discs, optical discs, flash memories, or forms of electrically programmable memories (EPROM) or electrically erasable and programmable (EEPROM) memories. Storage components 148 may store program instructions and/or information (e.g., data) associated with modules 126-136. Storage components 148 may include a memory configured to store data or other information associated with modules 126-136.

One or more processors 140 may implement functionality and/or execute instructions associated with host computing device 102. Examples of processors 140 include application processors, display controllers, auxiliary processors, one or more sensor hubs, and any other hardware configure to function as a processor, a processing unit, or a processing device. Modules 126-136 may be operable (or, in other words, executed) by processors 140 to perform various actions, operations, or functions of host computing device 102. That is, modules 126-136 may form executable bytecode, which when executed, cause processors 140 to perform specific operations (and thereby causing host computing device 102 to become a specific-purpose computer by which to perform) in accordance with various aspects of the techniques described herein. For example, processors 140 of host computing device 102 may retrieve and execute instructions stored by storage components 148 that cause processors 140 to perform the operations described herein that are attributed to modules 126-136. The instructions, when executed by processors 140, may cause host computing device 102 to store information within storage components 148.

Client computing device 202 may include components similar to host computing device 102. As further shown in the example of FIG. 1, client computing device 202 may include one or more processors 240, one or more communication units 242, one or more input components 244, one or more output components 246, and one or more storage devices 284. Each of components 212-284 may be similar to, if not substantially similar to, respective components 112-184, as described above. Client computing device 202 also includes communication channels 250 interconnecting modules 240-284. Communication channels 250 may be similar to, if not substantially similar to, communication channels 150 discussed in more detail above.

Furthermore, storage devices 284 may store an OS 226, which may be similar to, if not substantially similar to, respective OS 126.

Host computing device 102 may be integrated or otherwise included within a vehicle. The vehicle may include one or more of a bicycle, a tricycle, a unicycle, an automobile, farm equipment (such as a tractor, combine, etc.), construction equipment (a dump truck, crane, etc.), military vehicle or equipment (a tank, armament, etc.), a truck, a semi-tractor (or, in other words, a semi-trailer), aviation equipment (such as a plane), nautical equipment (such as a boat, carrier, etc.), or any other type of vehicle.

In this respect, host computing device 102 may represent a vehicle head unit that is integrated into a dashboard or other component of the vehicle, where host computing device 102 may be referred to alternatively as vehicle head unit 102, host vehicle head unit 102, and/or main computing device 102. In this context, processors 140 may retrieve and execute OS 126, which may be referred to as an embedded OS in that OS 126 is a fully specified OS that provides a full-featured application execution environment in which local applications (so-called "apps," which are not shown for ease of illustration) may be stored locally (e.g., to storage devices 184) and executed by processors 140 within the execution environment provided by OS 126.

OS 126 may, in this context, include a kernel that supports interaction between the applications and underlying hardware, such as processors 140, communication units 142, input components 144, output components 146, presence-sensitive display 112, and/or storage devices 184. The kernel may execute in so-called kernel space (which refers to a privileged OS-level execution environment) that is separate from a so-called user space that supports the application environment in which the applications execute. The kernel may expose an interface (such as an application programming interface—API) by which the user space (and applications executing therein) may access kernel space in a limited manner (e.g., having less privileges than the kernel) in order to interface with the underlying hardware.

OS 126, in other words, does not represent a thin client that supports projection, casting, or other processes by which to mirror output from an OS executed by a separate device, such as OS 226 executed by separate client computing device 202. OS 126 instead provides, as noted above, a full execution environment that is separate from OS 226 executed by client computing device 202 (or any other separate device) that facilitate local (e.g., on host computing device 102) execution of applications, rather than stream applications within OS 226 during execution by client computing device 202.

In this context of embedded OS 126 (which is another way to refer to OS 126), OS 126 may enable PAN links between host computing device 102 and client computing device 202 (or any other client computing device that supports PAN links for wireless communication between host computing device 102 and such client computing devices). OS 126 implements PAN stack 128 as a native function of OS 126 (meaning, within kernel space), thereby allowing OS 126 (and/or one or more applications executing within the user space) to establish PAN links with external devices, such as client computing device 202 (and potentially via the kernel API for applications executed locally by OS 126).

To establish a PAN link, OS 126 invokes PAN stack 128, which includes a discovery process by which PAN stack 128 configures communication units 142 to accept incoming connection requests. An operator of the vehicle may interface, e.g., via presence-sensitive display 112, with OS 126 to initiate the discovery process in which PAN stack 128 configures communication unit 142 (which again may implement a PAN interface, and therefore be referred to as PAN interface 142) to accept incoming connection requests.

The operator of the vehicle may next interface with client computing device 202, e.g., via presence-sensitive display 212, to have OS 226 invoke PAN stack 228 in order to configure communication unit 242 (which again may represent a PAN interface, and as such may be referred to as PAN interface 242) to initiate a pairing process that transmits the connection request in order to bond (or, in other words, pair) client computing device 202 to host computing device 102). The operator may next confirm that pairing should occur (generally, via a selection of a user interface element presented via presence-sensitive display 112 and/or presence-sensitive display 212). Pairing of client computing device 202 (or more specifically, PAN interface 242) and host computing device 102 (or more specifically, PAN interface 142) may include exchange of security keys that are used for encrypting or otherwise securing communications via the PAN link to be established between PAN interface 142 and PAN interface 242.

Pairing in this manner results in a semi-permanent bond between PAN interface 142 and PAN interface 242, meaning that client computing device 202 is paired to host computing device 102 until the pairing is explicitly, with user authorization, removed, either via host computing device 202 or client computing device 202. This pairing may also be user account agnostic, where other user accounts may identify this pairing as having occurred even though such user accounts are not associated with client computing device 202.

In other words, OS 126 may support multiple different user accounts, such as a root user account (or, stated differently, an administrator user account), a guest user account, and one or more dedicated user accounts. Each of these user accounts may view, due to the nature of PAN protocols, computing devices, such as client computing device 202, that were previously semi-permanently paired to host computing device 102.

For example, a first user logged into OS 126 under a first dedicated user account may view client computing devices that have been previously semi-permanently paired by a second user logged into OS 126 under a second, different dedicated user account even though the client computing devices paired by the second dedicated user account are not under the control of the first user or even locally available for a PAN link connection. Likewise, the second user account may access client computing devices previously semi-permanently paired by the first user account even though the second user is not in control of these client computing devices (paired by the first user) or even locally available for a PAN link connection.

In the context of a vehicle (or other shared computing device contexts, such as a laptop, desktop computer, tablet computer, etc.), the presentation by OS 126 of a full list of all client computing devices that have been previously semi-permanently paired to host computing device 102 across the user accounts may be disorienting and burdensome (as it may be difficult to identify the current client computing device—e.g., client computing device 202—to which you want to pair) to the current user logged into OS 126 under what the user assumed to be a private dedicated user account. The user may understand this full list of all client computing devices to be a breach of privacy (especially considering that the user may understand that this full list of client computing devices is presented to other dedicated user accounts).

However, most PAN protocol suites do not provide a mechanism by which to control an extent to which paired client computing devices are shared between user accounts. This inability to control the extent to which paired client computing devices are shared between user accounts likely arose due to the nature of PAN protocol development. That is, PAN protocols were developed for local connections in which shared host computing devices, e.g., desktop computers, laptop computers, smart speakers, smart hubs, smart televisions, etc., established connections with input/output client computing devices, such as wireless PAN mice, wireless PAN keyboards, wireless PAN headphones, and other devices, were shared across user accounts to facilitate input and/or output in support of interactions with the shared host client computing device.

As PAN protocols were implemented to facilitate interactions between the shared host computing devices (e.g., vehicle head unit 102) and dedicated (single user account) client computing devices (e.g., a smartphone as represented by client computing device 202) users began to notice that client computing devices were being presented across user accounts supported by OS 126. The private nature of dedicated (single user account) client computing devices may then be at odds with the shared nature of these host computing devices, resulting in concerns about privacy that leads the first user of the client computing device to remove paired client computing devices of which the current first user is unfamiliar. Such removal of the paired client computing devices may result in a different second user having to re-pair this client computing device that is unfamiliar to the first user, which may needlessly consume both time (from the first and second user perspective) and resources (from the perspective of host computing device 102 in terms of processor cycles, memory, memory bandwidth, etc. and the accompanying power).

In accordance with various aspects of the techniques described in this disclosure, host computing device 102 may establish separate PAN bonds for each user account supported by host computing device 102. To facilitate such user account aware PAN bonding, PAN stack 128 of OS 126 may assign a separate layer two host address for each user account, which PAN stack 128 may use to program PAN interface 142. By programming PAN interface 142 to use this separate layer two host address for a particular user account, client computing device 202 receives a dedicated and separate PAN link that effectively "sandboxes" the user account in terms of which devices are displayed as being associated with host computing device 102.

In this respect, various aspects of the techniques may enable host computing device 102 to operate more securely while also promoting more efficient operation. For example, by limiting PAN bonding to only those client computing devices that a user of the current client computing device, e.g., client computing device 202, knows to be associated with host computing device 102, the user may experience less confusion that results in feelings of data insecurity. As such, the user may not attempt to unpair (or, in other words, de-bond) unfamiliar client computing devices, which may involve host computing device 102 performing unnecessary operations that consume computing resources (such as, processor cycles, memory, memory bus bandwidth, etc. and the accompanying power). In this respect, data security may be improved from the perspective of the user of the client computing device, while also improving operation of host computing device 102 itself.

In operation, PAN stack 128 may store PAN configuration data (PCD) 129A-129N ("PCD 129"). Each one of PCD 129 may represent PCD for a separate user account supported by OS 126. As noted above, OS 126 may support a root user account, a guest user account, and one or more dedicated user accounts. PAN stack 128 may include PCD 129 for each user account, where for example root user account may be associated with PCD 129N, guest user account may be associated with PCD 129M, a first dedicated user account may be associated with PCD 129A, and a second dedicated user account may be associated with PCD 129B.

In this example, when a first user operating client computing device 202 logs into OS 126 under the first user account, OS 126 invokes PAN stack 128, which may retrieve PCD 129A from storage device 184. PCD 129A may include a separate layer two (L2) host address for use by PAN interface 142 when supporting a PAN link 143 with client computing device 202, where such L2 host address (L2HA) may be denoted as L2HA 149A. L2HA 149A may represent a Media Access Control (MAC) address or any other L2 address. Layer two, which is also referred to as a data link layer, may represent a second layer in the Open Systems Interconnection (OSI) model that defines network communications.

In any event, OS 126 may invoke PAN stack 128, passing data indicative of the first dedicated user account (e.g., an account identifier or other data uniquely identifying the first user account). PAN stack 128 may obtain PCD 129A using the data indicative of the first dedicated user account as a key to retrieving PCD 129A. PAN stack 128 may parse PCD 129A to obtain the L2HA 149A, which PAN stack 128 may use to initiate programming of PAN interface 142 to use L2HA 149A.

PAN interface 142 may next establish, using L2HA 149A, PAN link 143 with client computing device 202 associated with the first dedicated user account (assuming client computing device 202 has been previously paired to host computing device 102 when the first user has logged into OS 126 under the first user account). If client computing device 202 has not been previously paired to host computing device 102 while the first user has logged into OS 126 under the first user account, the first user may interface with PAN stack 128 via OS 126 system settings to initiate the above noted discovery/pairing (or, in other words, bonding) process.

In other words, PAN stack 128 may determine whether client computing device 202 has been previously associated with the first dedicated user account. PAN stack 128 may determine whether client computing device 202 has been previously associated with the first dedicated user account based on PCD 129A. PCD 129A may identify a list of one or more paired client computing devices that have been previously paired to PAN interface 142 when the first user was logged into OS 126 under the first dedicated user account. The list of the one or more paired client computing devices may identify client computing device 202 by way of a L2 client address (L2CA) used by PAN interface 242 when establishing a PAN link, such as PAN link 143. When PAN interface 242 performs the discovery/pairing process, PAN interface 242 may provide this L2CA to uniquely identify PAN interface 242, which PAN stack 128 may store to PCD 129A (assuming the first user is logged into OS 126 under the first dedicated user account).

Responsive to determining that client computing device 202 has not been previously associated with the first user account (e.g., the L2CA provided by PAN interface 242 does not match any of L2CA in the list of L2CAs provided by PCD 129A), PAN stack 128 may initiate a pairing process between PAN interface 142 of host computing device 102 and PAN interface 242 of client computing device 202. Responsive to successfully pairing PAN interface 142 and PAN interface 242, PAN stack 128 may store, to PCD 129A, an indication that PAN interface 242 of client computing device 202 is bonded to PAN interface 142.

Once paired (which again is semi-permanent), PAN stack 128 may indicate, via OS 126 system settings user interfaces, that client computing device 202 is paired (or, in other words, bonded) to host client computing device 202. Moreover, OS 126 may present client computing device 202 as bonded to PAN interface 142 under a user account specific L2HA, such as L2HA 149A, without presenting any other client computing devices associated with the remaining user accounts (that is, in the above example, the root user account, the guest user account, or any other remaining dedicated user accounts). Such separation occurs because PAN stack 128 maintains separate PCD 129 for each user account and, as a result, may only present PCD 129 associated with a given user account, rather than store PCD 129 as a collective that is associated with all of the user accounts supported by OS 126.

In this way, various aspects of the techniques may enable more secure PANs that are user account aware rather than being user account agnostic. OS 126 may invoke PAN stack 128 to present only those client computing devices that have been previously paired to OS 126 when a user is logged in under a given user account. The separate presentation may avoid user confusion and provide potentially more assurance that data security is being provided to the user in terms of sharing data among paired client computing devices. By avoiding such confusion, the user may not disable, unpair (or in other words, de-bond) unfamiliar client computing devices that would otherwise result in multiple users potentially pairing, unpairing, repairing, etc., which would otherwise needlessly waste computing resources of host computing device 102.

Although described with respect to host computing device 102, various aspects of the techniques may enable client computing device 202 to provide for separate user account bonding. In other words, PAN stack 228 of client computing device 202 may implement similar techniques to those described above with respect to PAN stack 128. OS 226 of client computing device 202 may support multiple accounts, which may result in PAN stack 228 maintaining separate PCD 229 for each user account (although not shown in the example of FIG. 1 for ease of illustration purposes). As such, PAN stack 228 may operate similarly to that described above with respect to PAN stack 128 in order to initiate programming of PAN interface 242 to use a L2CA when establishing PAN link 143. In this respect, client computing device 202 may operate similarly to host computing device 102 when establishing a PAN link, such as PAN link 143.

Figure 2:
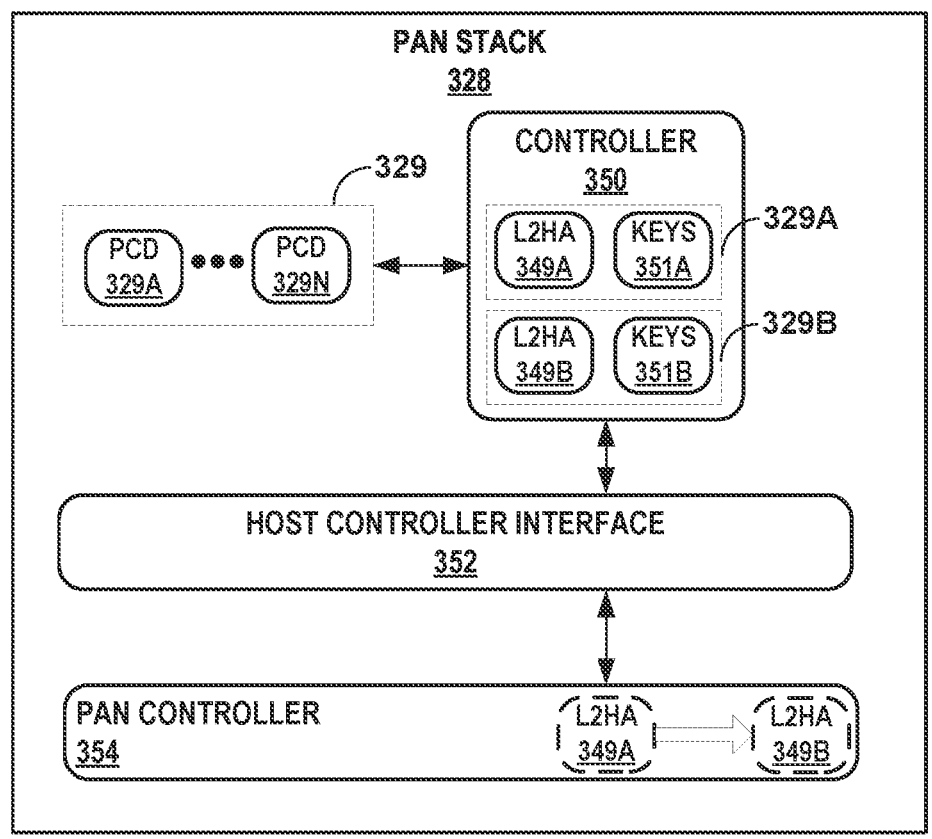
FIG. 2 is a block diagram illustrating example operation of a personal area network stack in performing various aspects of the user account aware personal area network bonding techniques described in this disclosure.

FIG. 2 is a block diagram illustrating example operation of a personal area network stack in performing various aspects of the user account aware personal area network bonding techniques described in this disclosure. In the example of FIG. 2, a PAN stack 328 may represent one example of PAN stack 128 (or, an example, of PAN stack 228 when configured to perform user account aware PAN bonding per various aspects of the techniques described in this disclosure).

In any event, PAN stack 328 may include a controller 350, a host component interface (HCI) 352, and a PAN controller 354. Controller 350 may generally control high-level PAN protocol stack operations, where in the example of Bluetooth™, may occur in accordance with link logic control and adaption layer protocol (L2CAP) as well as supporting different PAN profiles, such as a generic attribute (GATT) profile, a generic access protocol (GAP), an attribute (ATT) protocol, and supporting services, such as a security manager (SM).

HCI 352 may represent a module configured to provide a command interface to the baseband controller (which is another way to refer to PAN controller 354) that is implemented (as software and hardware, or as a hardware controller) on the underlying PAN interface (such as PAN interface 142). HCI 352 may generally represent a module that presents the interface (e.g., an API) to facilitate interactions between high-level protocol PAN protocol operations and low-level protocol PAN operations (in terms of the network stack as defined by the OSI model, where levels may refer to different higher or lower layers of the OSI model).

PAN controller 354 may represent a module configured to perform low-level PAN protocol operations in terms of controlling the baseband operations (e.g., L2 and L1 operation of PAN interface 142 and/or 242). PAN interface 142 may execute or otherwise implement (e.g., in hardware) PAN controller 354 to support low-level PAN protocol operations (such as baseband operations, which may also be referred to as L1—or, in other words, physical layer, operations in terms of the OSI model). PAN controller 354 may manage physical links, such as PAN link 143, providing packetization, channel control, and error correction along with other data integrity and flow control operations.

OS 126 may invoke, as described above, PAN stack 328 responsive to a user logging into OS 126 under a first dedicated user account, which may refer to a first user account dedicated for use by the first user. OS 126 may pass a user ID to PAN stack 328, which PAN stack 328 may use as a key to identify PCD 329A (which may represent an example of PCD 129A). PAN stack 328 may store a number of different PCD 329A-329N ("PCD 329") for different respective user accounts, each of which defines a different L2HA, such as L2HA 349A (which may represent an example of L2HA 149A). PAN stack 328 may associate each of PCD 329 with a different user ID, and access, based on the passed user ID representative of the user currently logged into OS 126 under a respective different user account, PCD 329 to obtain a corresponding one of PCD 329.

More specifically, PAN stack 328 may receive the first user ID, and invoke controller 350, which accesses storage (possibly within PAN interface 142 and may be represented generally by storage devices 184) to obtain PCD 329A that is associated with the first user ID. Controller 350 may be configured to parse PCD 329A to obtain L2HA 329A and associated security keys 351A that enables encryption and other security features for PAN link 143. As such, PCD 329A may include L2HA 349A and security keys 351A ("keys 351A," which may also be referred to as "link keys 351A").

Controller 350 may next interface, via HCI 352, with PAN controller 354 to initiate programming of L2HA 349A within PAN controller 354. Controller 350 interface with HCI 352 to issue a write address command (including L2HA 349A) to PAN controller 354 (or, in other words, PAN interface 142) to program PAN controller 354 to use L2HA 329A, which may, as one example, include a MAC address. PAN controller 354 may next initiate or otherwise establish PAN link 143 with client computing device 202 associated with the first user account.

In some instances, a second user may interface with OS 126 to login to OS 126 under a second, different dedicated user account. OS 126 may process the login under the second dedicated user account and invoke PAN stack 328, passing a second user ID associated with the second dedicated user account. Controller 350 of PAN stack 328 may identify, based on the second user ID, PCD 329B and retrieve PCD 329B from storage, where PCD 329B includes L2HA 349B and keys 351B (which may also be referred to as "security keys 351B" or "link keys 351B").

Controller 350 may next interface, via HCI 352, with PAN controller 354 to replace L2HA 349A with L2HA 349B, thereby distinguishing PAN link 143 from a potential PAN link (which may be denoted as PAN link 143B while the previous PAN link may be denoted as PAN link 143A) between host computing device 102 when the second user is logged into OS 126 under the second, different dedicated user account and a second, different client computing device (which is not shown in the example of FIG. 1 for ease of illustration).

The second, different client computing device may be similar to, if not substantially similar to, first client computing device 202. As such, the second client computing device may be denoted as client computing device 202B, while the first client computing device may be denoted as client computing device 202A. As such, components of second client computing device 202B may be denoted using the "B" label (e.g., "PAN interface 242B") while the components of first client computing device 202A may be denoted using the "A" label (e.g., PAN interface 242A").

Controller 350 may, in other words, obtain, from the memory (such as storage devices 184), PCD 329B of PCD 329 that is specific to the second user account (and associated with the second user account via the user ID). Controller 350 may initiate programming, via the above noted write command, PAN controller 354 to use L2HA 349B included in PCD 329B. PAN controller 354 may then establish, using L2HA 349B, a second PAN link 143B with client computing device 202B associated with the second user account.

In some examples, client computing device 202B may be the same as client computing device 202A. That is, because PCD 329 is unique to a given user account of OS 126, the same client computing device may be associated with multiple different user accounts of OS 126, which may require the same client computing device, e.g., client computing device 202, to separately pair (or, in other words, bond) with host computing device 102. In this respect, client computing device 202A may be associated with host computing device 102 under the first user account, and the same client computing device (e.g., client computing device 202B) may be associated with host computing device 102 under the second user account. PAN controller 354 may however be programmed to use a different L2HA 349A/349B depending on which user is logged into OS 126 under the separate first and second dedicated user accounts.

In addition, by separately maintaining PCD 129 for each user account, PCD 129 may be separately transferred between host computing devices 102 (where a first host computing device may be denoted as host computing device 102A and a second host computing device may be denoted as host computing device 102B). Host computing device 102A and host computing device 102B may each include similar components to those described above with respect to host computing device 102.

OS 126 of host computing device 102A may initiate a transfer of PCD 129A (for example) to different host computing device 102B. In some examples, OS 126 of host computing device 102A may store a copy of PCD 129A to a network server (e.g., in the so-called cloud) in an online account associated with the user of client computing device 202 and initiate a transfer of PCD 129A to OS 126 of host computing device 102B, which may pass PCD 129A to PAN stack 128. In other examples, OS 126 of host computing device 102B may initiate the transfer of PCD 129A via a wired (e.g., via Ethernet, Universal System Bus—USB—such as by way of a thumb drive or other portable storage media, etc.) or wireless (e.g., wireless local area network, cellular, etc.) connection.

PAN stack 128 of host computing device 102B may install PCB 129A, associating PCB 129A with a given user account supported by OS 126 of host computing device 129B. When the user logs into the given user account, OS 126 of host computing device 129B may access PCB 129A and establish PAN link 143 via PAN interface 142 without requiring client computing device 202 to perform the pairing process, as L2HA 149A is already known to client computing device 202 and all keys (e.g., keys 351A) and other data associated with client computing device 202 is already present in the form of PCD 129A. In this way, OS 126 of host computing device 102A may initiate a transfer of the PCD 129A to host computing device 129B so as to enable host computing device 129B to establish, without performing a pairing process client computing device 202, PAN link 143 with client computing device 202.

Figure 3:
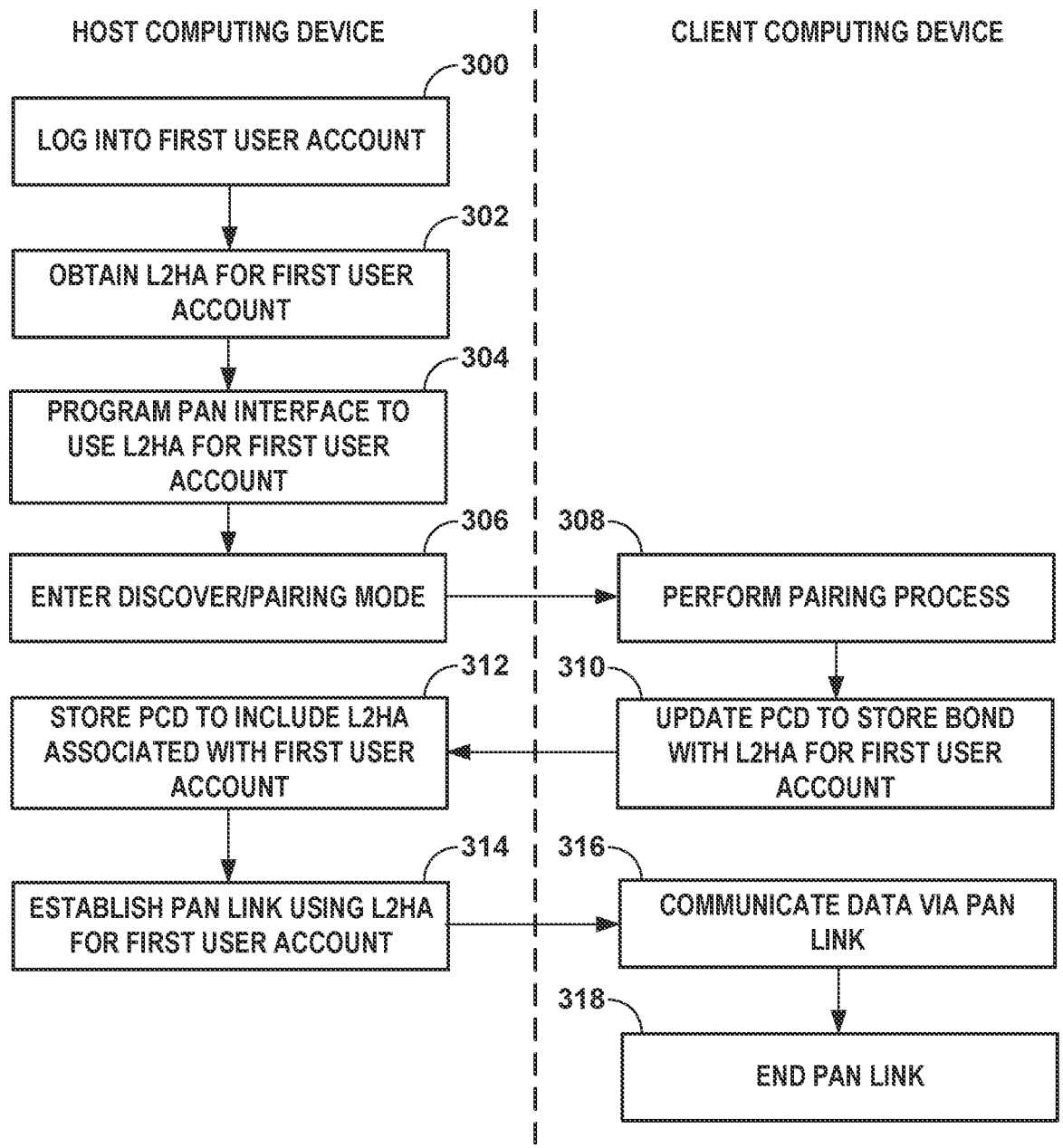
FIG. 3 is a flowchart illustrating example operation of the system shown in the example of FIG. 1 in performing a pairing process in accordance with various aspects of the user account aware personal area network bonding techniques described in this disclosure.

FIG. 3 is a flowchart illustrating example operation of the system shown in the example of FIG. 1 in performing a pairing process in accordance with various aspects of the user account aware PAN bonding techniques described in this disclosure. In the example of FIG. 3, OS 126 may initially log into a first user account (300), whereupon OS 126 may invoke PAN stack 128, passing a user ID associated with the first user account to PAN stack 128.

PAN stack 128 may determine whether there exists any PCD 129 associated with the user ID. Assuming that no PCD 129 has yet been created for the first user, PAN stack 128 may obtain L2HA (e.g., L2HA 149A) for use by the first user account (302). PAN stack 128 may interface with OS 126 to obtain L2HA 149A, where OS 126 may include a pool of L2HA that OS 126 may assign to PAN stack 128. In some examples, each user account is statically defined by OS 126 (such as the root user account, guest user account, the first dedicated user account, and the second dedicated user account). In these instances of statically defined user accounts, OS 126 may statically allocate a L2HA for each of the user accounts for use by PAN stack 128, where PAN stack 128 may define PCD 129 for each user account that defines the L2HA for use by each user account. In any event, PAN stack 128 may program PAN interface 142 to use L2HA 149A for the first user account (where "program" should be understood to refer to initiation of such programming by issuing a write address command via HCI 352 to PAN controller 354) (304).

Once the PAN interface 142 is programmed to use L2HA 149A for the first user account, OS 126 may allow the user to initiate the discover/pairing mode where PAN interface 142 may enter the discover/pairing mode (306). The user may next interface with client computing device 102 to perform the pairing process by which to establish the semi-permanent bond between PAN interface 142 (using the user account specific L2HA 149A) and PAN interface 242 (308).

PAN stack 228 may update PCD 229 to indicate that this semi-permanent bond exists with PAN interface 142, storing associated security keys (e.g., keys 351A) and any other information necessary to reestablish this bond with PAN interface 142 when programmed with L2HA 149A without having to re-perform the pairing process. As such, PAN stack 228 updates PCD 229 to store the bond with L2HA 149A for the first user account (310). Likewise, PAN stack 128 may store or otherwise update PCD 129A to include L2HA associated with the first user account (as well as perform similar operations with regard to storing security keys 351A and any other information required to reestablish this bond with PAN interface 242 when programmed with L2HA 149A without having to re-perform the pairing process) (312).

After performing the pairing process, PAN stack 128 may interface with PAN interface 142 to establish PAN link 143 using L2HA 149A for the first user account (314). OS 226 may then interface with PAN stack 228 to initiate transfer of data via PAN link 143. PAN stack 228 may interface with PAN interface 242 to communicate the data via PAN link 143 (316). Such data communications may continue until at some point the PAN link is ended. PAN stack 228 may end PAN link 143 (318).

Figure 4:
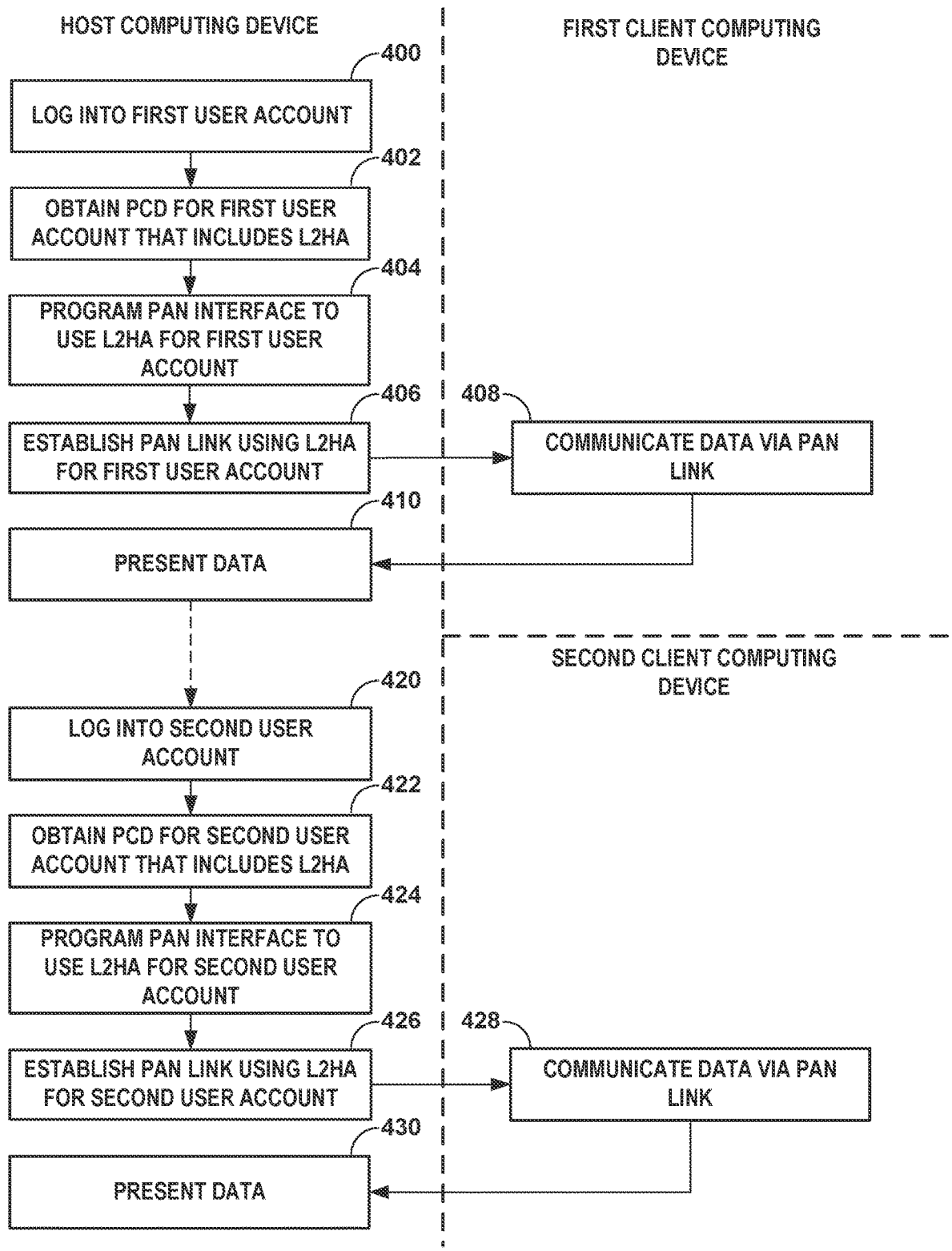
FIG. 4 is another flowchart illustrating further example operation of the system shown in the example of FIG. 1 in performing various aspects of the user account aware PAN bonding techniques described in this disclosure.

FIG. 4 is another flowchart illustrating further example operation of the system shown in the example of FIG. 1 in performing various aspects of the user account aware PAN bonding techniques described in this disclosure. In the example of FIG. 4, it is assumed that client computing device 102A (which as noted above refers to a first client computing device) and client computing device 102B (which again, as noted above, refers to a second client computing device that is similar to if not substantially similar to client computing device 102A) have been previously paired to host computing device 102. As such, PCD 129A and 129B have been established via the prior pairing process.

Initially, OS 126 may log into a first user account (400). OS 126 may invoke PAN stack 128, passing the user ID associated with the first user account. Using this user ID, PAN stack 128 may obtain PCD 129A for the first user account that includes L2HA 149A (402). PAN stack 128 may next program PAN interface 142 to use L2HA 149A for the first user account (404). PAN stack 128 may next interface with PAN interface 142 to establish PAN link 143A using L2HA 149A for the first user account (406). Client computing device 202A may communicate data via PAN link 143A (408), where OS 126 of host computing device 102 may present such data via one or more of the various outputs discussed above in more detail (410).

In some instances, OS 126 may switch user accounts, where for example OS 126 may log into a second, different user account (420). Responsive to switching user accounts, OS 126 may again invoke PAN stack 128, passing a user ID associated with the second user account. Using the user ID associated with the second user account, PAN stack 128 may obtain PCD 129B for the second user account that includes L2HA 149B (422). PAN stack 128 may program PAN interface 142 to use L2HA 149B for the second user account (which replaces L2HA 149A) (424). PAN stack 128 may next interface with PAN interface 142 to establish PAN link 143B using L2HA 149B for the second user account (426). Client computing device 202B may communicate data via PAN link 143B (428), where OS 126 of host computing device 102 may present such data via one or more of the various outputs discussed above in more detail (430).

By using separate L2HA 149A and 149B for different user accounts, PAN stack 128 may maintain (or, in other words, store and update) separate PCD 129A and 129B, allowing PAN stack 128 to only provide bonds with client computing devices that have been specifically bonded to the respective user account, rather than generally to host computing device 102. The various users may still bond a single client computing device 102 to each of the separate user accounts but will have to individually pair client computing device 102 to each of the separate user accounts. However, the process of pairing is relatively straightforward and benefits the user by making the bond explicit from the perspective of the user, thereby avoiding any confusion that can result in unnecessary operations (as a result of deleting bonds and having to reestablish such bonds) that may impact operation of host computing device 102 (and also possibly client computing device 202). As such, the techniques may, as noted above, improve operation of host computing device 102 itself.

In this way, various aspects of the techniques described in this disclosure may enable the following examples.

Examples 1. A host computing device, comprising: a personal area network interface; a memory configured to store personal area network configuration data for each user account of a plurality of different user accounts, the personal area network configuration data including a separate layer two host address for use by the personal area network interface when supporting a personal area network link with a client computing device associated with a respective user account of the plurality of user accounts; and one or more processors configured to execute an operating system, the operating system configured to, responsive to a first user account of the plurality of user accounts logging into the operating system: obtain, from the memory, first personal area network configuration data of the personal area network configuration data specific to the first user account; and initiate programming of the personal area network interface to use a first layer two host address included in the first personal area network configuration data, wherein the personal area network interface is configured to establish, using the first layer two host address, a first personal area network link with a first client computing device associated with the first user account.

Example 2. The host computing device of example 1, wherein the operating system is further configured to, when the first user account has logged into the operating system and after the personal area network interface has been programmed to use the first layer two host address: determine whether the first client computing device has been previously associated with the first user account; responsive to determining that the first client computing device has not been previously associated with the first user account, initiate a pairing process between the personal area network interface and the first client computing device; responsive to successfully pairing the personal area network interface and the first client computing device, storing, to the first personal area network configuration data, an indication that the first client computing device is bonded to the personal area network interface.

Example 3. The host computing device of example 2, wherein the operating system is further configured to present the first client computing device as bonded to the personal area network interface without presenting any other client computing devices associated with remaining user accounts of the plurality of different user accounts.

Example 4. The host computing device of any combination of examples 1-3, wherein the operating system is further configured to, responsive to a second user account of the plurality of different user accounts logging into the operating system: obtain, from the memory, second personal area network configuration data of the personal area network configuration data specific to the second user account; and initiate programming of the personal area network interface to use a second layer two host address included in the second personal area network configuration data, wherein the personal area network interface is configured to establish, using the second layer two host address, a second personal area network link with a second client computing device associated with the second user account.

Example 5. The host computing device of example 4, wherein the second client computing device is the same as the first client computing device, and wherein the first layer two host address is different than the second layer two host address.

Example 6. The host computing device of any combination of examples 1-5, wherein the operating system is, when configured to initiate programming of the personal area network interface, configured to interface with a host controller interface to issue a write address command to the personal area network interface so as to program the personal area network interface to use the first layer two host address.

Example 7. The host computing device of any combination of examples 1-6, wherein the layer two host address comprises a media access control address.

Example 8. The host computing device of any combination of examples 1-7, wherein the first personal area network configuration data includes first link keys for establishing the first personal area network link.

Example 9. The host computing device of any combination of claims 1-8, wherein the host computing device comprises a vehicle head unit in which the one or more processors execute the operating system to enable the user to control functionality associated with a vehicle.

Example 10. The host computing device of any combination of examples 1-9, wherein the first client computing device includes one or more of a smartphone, a smart watch, smart glasses, a laptop computer, a tablet computer, and a portable gaming system.

Example 11. A method comprising: storing personal area network configuration data for each user account of a plurality of different user accounts, the personal area network configuration data including a separate layer two host address for use by a personal area network interface when supporting a personal area network link with a client computing device associated with a respective user account of the plurality of user accounts; executing an operating system that, responsive to a first user account of the plurality of user accounts logging into the operating system: obtains, from the memory, first personal area network configuration data of the personal area network configuration data specific to the first user account; and initiates programming of the personal area network interface to use a first layer two host address included in the first personal area network configuration data; and establishing, using the first layer two host address, a first personal area network link with a first client computing device associated with the first user account.

Example 12. The method of example 11, wherein the operating system is further configured to, when the first user account has logged into the operating system and after the personal area network interface has been programmed to use the first layer two host address: determine whether the first client computing device has been previously associated with the first user account; responsive to determining that the first client computing device has not been previously associated with the first user account, initiate a pairing process between the personal area network interface and the first client computing device; and responsive to successfully pairing the personal area network interface and the first client computing device, store, to the first personal area network configuration data, an indication that the first client computing device is bonded to the personal area network interface.

Example 13. The method of example 12, wherein the operating system is further configured to present the first client computing device as bonded to the personal area network interface without presenting any other client computing devices associated with remaining user accounts of the plurality of different user accounts.

Example 14. The method of any combination of examples 11-13, wherein the operating system is further configured to, responsive to a second user account of the plurality of different user accounts logging into the operating system: obtain, from the memory, second personal area network configuration data of the personal area network configuration data specific to the second user account; and initiate programming of the personal area network interface to use a second layer two host address included in the second personal area network configuration data, wherein the method further comprises establishing, using the second layer two host address, a second personal area network link with a second client computing device associated with the second user account.

Example 15. The method of example 14, wherein the second client computing device is the same as the first client computing device, and wherein the first layer two host address is different than the second layer two host address.

Example 16. A non-transitory computer-readable storage medium having instructions stored thereon that, when executed, cause one or more processors of a host computing device to: store personal area network configuration data for each user account of a plurality of different user accounts, the personal area network configuration data including a separate layer two host address for use by a personal area network interface when supporting a personal area network link with a client computing device associated with a respective user account of the plurality of user accounts; execute an operating system that, responsive to a first user account of the plurality of user accounts logging into the operating system: obtains, from the memory, first personal area network configuration data of the personal area network configuration data specific to the first user account; and initiates programming of the personal area network interface to use a first layer two host address included in the first personal area network configuration data; and establish, using the first layer two host address, a first personal area network link with a first client computing device associated with the first user account.

Example 17. The non-transitory computer-readable storage medium of claim 16, wherein the operating system is, when configured to initiate programming of the personal area network interface, configured to interface with a host controller interface to issue a write address command to the personal area network interface so as to program the personal area network interface to use the first layer two host address.

Example 18. The non-transitory computer-readable storage medium of any combination of examples 16 and 17, wherein the layer two host address comprises a media access control address.

Example 19. The non-transitory computer-readable storage medium of any combination of examples 16-18, wherein the first personal area network configuration data includes first link keys for establishing the first personal area network link.

Example 20. The non-transitory computer-readable storage medium of any combination of examples 16-19, wherein the host computing device comprises a vehicle head unit in which the one or more processors execute the operating system to enable the user to control functionality associated with a vehicle.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, ultra Blu-ray, etc. where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A host computing device, comprising:
a personal area network interface;
a memory configured to store personal area network configuration data for each user account of a plurality of different user accounts, the personal area network configuration data including a separate layer two host address for use by the personal area network interface when supporting a personal area network link with a client computing device associated with a respective user account of the plurality of user accounts; and
one or more processors configured to execute an operating system, the operating system configured to, responsive to a first user account of the plurality of user accounts logging into the operating system:
obtain, from the memory, first personal area network configuration data of the personal area network configuration data specific to the first user account; and
initiate programming of the personal area network interface to use a first layer two host address included in the first personal area network configuration data,
wherein the personal area network interface is configured to establish, using the first layer two host address, a first personal area network link with a first client computing device associated with the first user account.

2. The host computing device of claim 1, wherein the operating system is further configured to, when the first user account has logged into the operating system and after the personal area network interface has been programmed to use the first layer two host address:
determine whether the first client computing device has been previously associated with the first user account;
responsive to determining that the first client computing device has not been previously associated with the first user account, initiate a pairing process between the personal area network interface and the first client computing device;
responsive to successfully pairing the personal area network interface and the first client computing device, storing, to the first personal area network configuration data, an indication that the first client computing device is bonded to the personal area network interface.

3. The host computing device of claim 2, wherein the operating system is further configured to present the first client computing device as bonded to the personal area network interface without presenting any other client computing devices associated with remaining user accounts of the plurality of different user accounts.

4. The host computing device of claim 1, wherein the operating system is further configured to, responsive to a second user account of the plurality of different user accounts logging into the operating system:
obtain, from the memory, second personal area network configuration data of the personal area network configuration data specific to the second user account; and
initiate programming of the personal area network interface to use a second layer two host address included in the second personal area network configuration data,
wherein the personal area network interface is configured to establish, using the second layer two host address, a second personal area network link with a second client computing device associated with the second user account.

5. The host computing device of claim 4,
wherein the second client computing device is the same as the first client computing device, and
wherein the first layer two host address is different than the second layer two host address.

6. The host computing device of claim 1, wherein the operating system is, when configured to initiate programming of the personal area network interface, configured to interface with a host controller interface to issue a write address command to the personal area network interface so as to program the personal area network interface to use the first layer two host address.

7. The host computing device of claim 1, wherein the layer two host address comprises a media access control address.

8. The host computing device of claim 1, wherein the first personal area network configuration data includes first link keys for establishing the first personal area network link.

9. The host computing device of claim 1, wherein the host computing device comprises a vehicle head unit in which the one or more processors execute the operating system to enable the user to control functionality associated with a vehicle.

10. The host computing device of claim 1, wherein the first client computing device includes one or more of a smartphone, a smart watch, smart glasses, a laptop computer, a tablet computer, and a portable gaming system.

11. The host computing device of claim 1,
wherein the host computing device is a first host computing device, and
wherein the one or more processors are further configured to:
initiate a transfer of the personal area network configuration data to a second host computing device so as to enable the host computing device to establish, without performing a pairing process with the client computing device, the personal area network link with the client computing device.

12. A method comprising:
storing personal area network configuration data for each user account of a plurality of different user accounts, the personal area network configuration data including a separate layer two host address for use by a personal area network interface when supporting a personal area network link with a client computing device associated with a respective user account of the plurality of user accounts;
executing an operating system that, responsive to a first user account of the plurality of user accounts logging into the operating system:
obtains, from the memory, first personal area network configuration data of the personal area network configuration data specific to the first user account; and
initiates programming of the personal area network interface to use a first layer two host address included in the first personal area network configuration data; and
establishing, using the first layer two host address, a first personal area network link with a first client computing device associated with the first user account.

13. The method of claim 12, wherein the operating system is further configured to, when the first user account has logged into the operating system and after the personal area network interface has been programmed to use the first layer two host address:
determine whether the first client computing device has been previously associated with the first user account;
responsive to determining that the first client computing device has not been previously associated with the first user account, initiate a pairing process between the personal area network interface and the first client computing device; and
responsive to successfully pairing the personal area network interface and the first client computing device, store, to the first personal area network configuration data, an indication that the first client computing device is bonded to the personal area network interface.

14. The method of claim 13, wherein the operating system is further configured to present the first client computing device as bonded to the personal area network interface without presenting any other client computing devices associated with remaining user accounts of the plurality of different user accounts.

15. The method of claim 12, wherein the operating system is further configured to, responsive to a second user account of the plurality of different user accounts logging into the operating system:
obtain, from the memory, second personal area network configuration data of the personal area network configuration data specific to the second user account; and
initiate programming of the personal area network interface to use a second layer two host address included in the second personal area network configuration data,
wherein the method further comprises establishing, using the second layer two host address, a second personal area network link with a second client computing device associated with the second user account.

16. The method of claim 15,
wherein the second client computing device is the same as the first client computing device, and
wherein the first layer two host address is different than the second layer two host address.

17. A non-transitory computer-readable storage medium having instructions stored thereon that, when executed, cause one or more processors of a host computing device to:
store personal area network configuration data for each user account of a plurality of different user accounts, the personal area network configuration data including a separate layer two host address for use by a personal area network interface when supporting a personal area network link with a client computing device associated with a respective user account of the plurality of user accounts;
execute an operating system that, responsive to a first user account of the plurality of user accounts logging into the operating system:
obtains, from the memory, first personal area network configuration data of the personal area network configuration data specific to the first user account; and
initiates programming of the personal area network interface to use a first layer two host address included in the first personal area network configuration data; and
establish, using the first layer two host address, a first personal area network link with a first client computing device associated with the first user account.

18. The non-transitory computer-readable storage medium of claim 17, wherein the operating system is, when configured to initiate programming of the personal area network interface, configured to interface with a host controller interface to issue a write address command to the personal area network interface so as to program the personal area network interface to use the first layer two host address.

19. The non-transitory computer-readable storage medium of claim 17, wherein the layer two host address comprises a media access control address.

20. The non-transitory computer-readable storage medium of claim 17, wherein the first personal area network configuration data includes first link keys for establishing the first personal area network link.

* * * * *